Jan. 14, 1958  J. SALAUZE  2,820,077
ELECTRODES FOR GALVANIC CELLS AND METHOD OF MAKING SAME
Filed March 12, 1954
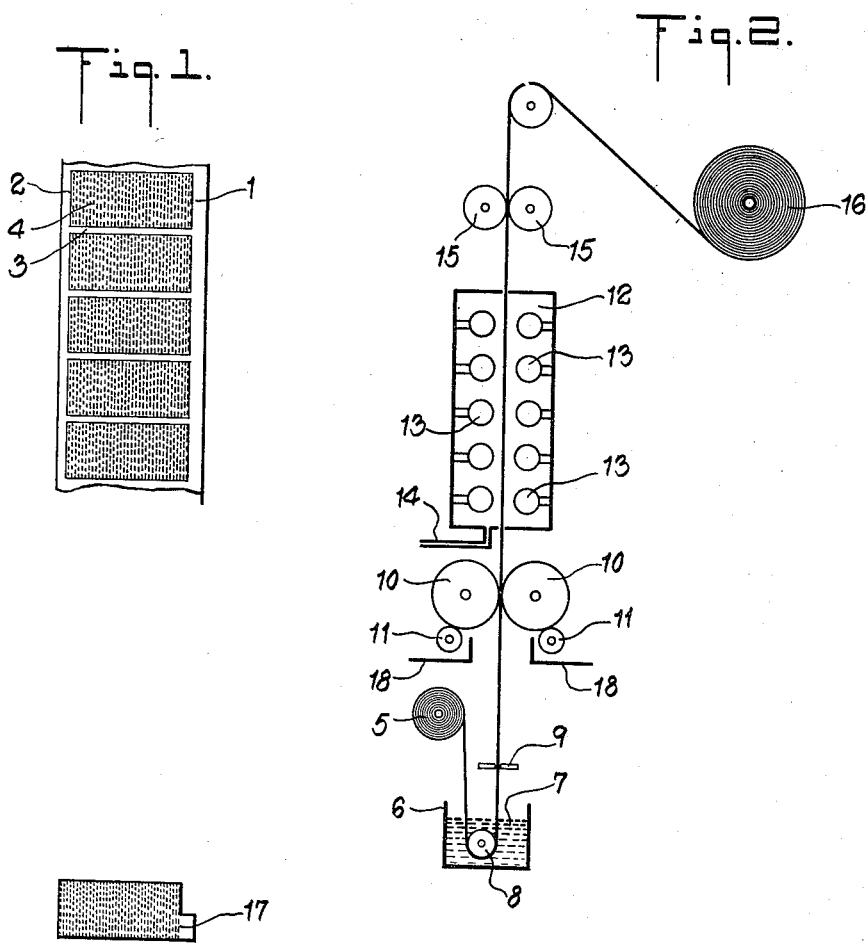
INVENTOR.
JEAN SALAUZE
BY
Kenyon & Kenyon
ATTORNEYS United States Patent Office 2,820,077
Patented Jan. 14, 1958

2,820,077

ELECTRODES FOR GALVANIC CELLS AND METHOD OF MAKING SAME

Jean Salauze, Paris, France, assignor to Societe des Accumulateurs Fixes et de Traction (Societe Anonyme), Pont de la Folie, Romainville, France, a company of France Application March 12, 1954, Serial No. 415,747

Claims priority, application France March 17, 1953

16 Claims. (Cl. 136—19)

This invention relates to electrodes for galvanic cells, and has as an object the production, by a novel method, of improved electrodes, or plates, which make possible discharge rates higher than those heretofore possible with correspondingly low voltage drop. Other objects of my invention will be made apparent by the following specification.

The capacity for discharge at extremely high rates is more and more required from galvanic cells. In other words it is desired to have a cell whose voltage remains at a relatively high level while, at the same time, it is able to deliver discharge currents whose intensity expressed in amperes would be 20 to 30 times the capacity of the cell expressed in ampere-hours. For this purpose, the surface of the plates has to be considerably increased, that is, a great number of very thin plates must be used, providing a great surface per capacity unit. Moreover, it is essential to use active materials which are themselves highly divided so as to facilitate to the utmost the electrochemical exchanges. The large number of such plates required for a given capacity means a very high cost price when the plates are manufactured by known methods.

The present invention provides a process of continuous manufacture of plates for alkaline primary and secondary cells which is both simple and economical. Moreover, my novel process makes it possible to prepare plates of various thicknesses, and particularly very thin plates. We may also use active material in highly divided form, which is an essential condition for quick electrochemical exchanges. Finally the process is very general, for it may be applied whenever the active material to be used is in the metallic condition and in the form of very fine powder, with a physical or crystalline structure such that the said powder may easily interlace under the influence of pressure.

The process, essentially, consists in coating both faces of a continuously moving perforated metallic band with a suspension of the said active material in water or in any other suitable volatile liquid in which has been dissolved a material imparting a high viscosity to the solution. The band next runs through a dryer in order to dry the coating. Then the band and the coats are compressed between two rollers, in order to produce the desired interlacing. Finally, the band is cut up into pieces corresponding to the required plate dimensions.

In the drawings:

Fig. 1 shows a view of a preferred embodiment of the carrying band;

Fig. 2 shows a diagrammatic view of a preferred embodiment of the manufacture process; and Fig. 3 is a plan view of a plate obtained after the cutting of the band prepared according to the process.

The supporting member or core of my novel plates is constituted of a long metallic band. It is made of a metal substantially unaffected by the electrolyte of the galvanic cell. However, this is no essential condition, when the plate is to be used in quick deferred action type batteries. Practically, nickel, copper, and iron will be mainly used for economical reasons. Moreover, the metal of the band can be coated with thin layers of other metals, either by electroplating, or by spraying, or by any other appropriate means. The band may be either a solid band or a screen with a mesh a few millimetres in width. Solid bands, such as obtained through rolling, are especially convenient for use.

The thickness of the band may vary to a certain extent according to the surface and thickness of the plates which are to be obtained, and also according to the intensity of the discharge currents which are required from the galvanic cell. The thickness of the band may be from 0.05 millimetre up to 0.15 millimetre, or even more, if it is necessary.

In order to make the further band-cutting operation easier, it is advisable that the width of the band should be a multiple of the length or the width of the plates, to be obtained. In a preferred embodiment of the invention, shown in Fig. 3, the width of the band is merely equal to the length of the plate.

When a solid band is used it is first perforated by stamping or any other mechanical process. The perforations may assume various geometrical shapes. However, it is advisable to use circular perforations with approximately 1 to 3 millimetres diameter, the said perforations being regularly distributed, so that the perforated surface may be about 30 to 60% of the total surface. During the perforating step, there will preferably be left a non-perforated zone 1, of sufficient width, so that the plate-head (17, Fig. 3) can later be cut from it. On the other side of the band, the edge 2 a few millimetres wide, intended to be the bottom of the plates, is preferably similarly left unperforated. Finally, cross zones 3, a few millimetres wide, will also be left imperforate. The plates are to be made by shearing crosswise within the zones 3 of the band. Quadrilaterals 4 are perforated. Of course, the non-perforated zone disposition varies according to each different cutting method. Besides, the non-perforated zone arrangement is not essential; it is only useful.

It is obvious that this perforating step becomes unnecessary when a screen is used as the band.

After the above described mechanical preparation, the band is preferably first nickel plated by passing it through a conventional nickel plating bath. Both faces of the band are thus covered with a nickel coat, a few microns thick. The operation is not absolutely necessary; however it is useful when the band is made of copper or iron, the metals being so protected against corrosion or further attack. Upon nickel plating, the band may also be coated with a thin layer of the same metal as the active material. This operation is not absolutely necessary, though it is useful, as described below. It can be accomplished either by electroplating or by spraying. When the active material is zinc, we may coat the band either with a thin layer of zinc or else a layer of cadmium. The zinc and cadmium prevent the active material zinc from being discharged by local couples, which, otherwise, would be likely to develop between the active material and the band.

Any active material can be used, provided it may be introduced into the galvanic cell in the metallic form and it may be prepared in the form of minute particles or crystals having a microscopic size and a physical structure such as will promote the component interlacing under the effect of pressure. Acicular and ramified shapes, which are sometimes called dendritic or arborescent are the preferred physical or crystalline shapes. Several metals, such as silver, lead, tin, cadmium, zinc, for instance, may be caused to assume these shapes. A primary object of my invention is the use of cadmium and zinc, of which extensive use is made in the construction of negative electrodes for primary and secondary cells. But the use of these two metals is not to be construed as limiting the invention. The construction of silver positive electrodes, for instance, is also an object of the invention.

Cadmium, in the form of microscopic acicular or arborescent crystals, can be obtained by the action of powdered aluminum or zinc upon solutions of cadmium salts. It may also be obtained through the electrolysis of solutions of cadmium chloride or sulphate by using a high current density on the cathode. It is known that so-called "spongy" cadmium, thus obtained through electrolysis, and used as the negative active material in alkaline batteries, gradually loses its capacity. It is also known that in order to stop, and even to suppress the loss of capacity, it is advisable to use a mixture of said spongy cadmium with suitable quantities of iron or nickel as large as 25%, about, of the total weight. Such mixtures will result from the electrolysis of a mixture of cadmium and iron or nickel salts, in a suitable ratio. The cadmium is the prevailing element in the spongy product deposited upon the cathode, and the presence of either secondary metal (iron or nickel) does not affect the tendency to interlacing. In the following part, the specific name "active material cadmium" will identify the cadmium alone as well as cadmium-iron, or cadmium-nickel mixtures, prepared according to the above description.

Zinc, in the form of microscopic crystals having dendritic or arborescent shapes, may also be prepared through electrolysis, with use of a high current density on the cathode. The electrolysis can be carried out, either with solutions of zinc sulphate or chloride, or else with alkaline solutions of sodium or potassium zincates. Zinc in the form of very thin needles, slightly barbed, shows good interlacing properties and can also be used. Zinc exhibiting these peculiar characteristics is obtained by blowing a strong compressed air jet on a thin trickle of melted zinc running from a hole drilled in a crucible which contains the molten metal.

The described processes for the manufacture of the metals in the desired physical or crystalline forms are known, and therefore no further description is necessary.

The following step consists in preparing a suspension of the active powdered material in a liquid medium of a high viscosity. This medium can be any volatile liquid which does not alter or react with the active material and in which suitable products are dissolved in order to give sufficient viscosity to the medium, so that the active material may remain in suspension without leaving any deposit. The suspension, therefore, remains homogeneous, and its composition remains constant. Water is the most practical and economical liquid. In order to have a sufficient viscosity, a few percent by weight of such organic products as alginates, gelatins, starch and more particularly such soluble cellulose derivatives, as the alkaline or ammonium salts of the carboxymethylcellulose, the methylcelluloses, the hydroxyalkylcelluloses: hydroxyethylcelluloses and hydroxypropylcelluloses are dissolved in the suspension. The cellulose derivatives, particularly, used in very small amounts, give a viscosity as high as 4,000 centipoises; though such high viscosity is not required. Moreover, these cellulose derivatives give the suspension good adhesive properties. The amount of the organic product to be used depends upon its chemical nature and more particularly upon the degree of viscosity it may give. Usually the quantity varies between 1 and 5%. Besides, there is no regular rule of proportionality between the quantity of liquid and the quantity of metallic powder used to prepare the suspension. The amount of powder to be introduced into a given volume of the liquid greatly depends upon the crystalline shape, the size and especially the extent of ramifications of the crystals. The two following examples are given by way of illustration and not to be construed as limiting the invention.

*Example 1.*—One mixes up for a few minutes in a mixer, the following mixture:

| | |
|---|---|
| Water _____litres__ | 10 |
| Sodium salt of the carboxymethylcellulose___grams__ | 400 |
| Pulverulent active material cadmium obtained through electrolysis_____kg__ | 10 |

*Example 2.*—One mixes up for a few minutes in a mixer, the following mixture:

| | |
|---|---|
| Water _____litres__ | 10 |
| Sodium salt of the carboxymethylcellulose___grams__ | 300 |
| Zinc powder obtained by blowing_____kg__ | 30 |

Fig. 2 shows, in diagrammatic manner, a preferred embodiment of a device for carrying out my method of manufacture. The viscous mixture 7, prepared according to the previous description, is put into the container 6. The long perforated band is unwound from roll 5 passing under roll 8 which is submerged in the mixture. As the band passes through the mixture, both faces and the inside of the perforations get covered with a rather thick layer of the viscous suspension. The total thickness of the viscous layer which is left on the band and on which the thickness and capacity of the plates depends, is controlled by the passage of the band through and in contact with the edges of a slot of adjustable width 9. The slot is preferably made in such a conformation as to substantially completely remove the coatings which cover zones 1 and 2 of the band, as the band passes through. The band preferably next passes between two rolls 10, adjustably spaced, which bring a slight pressure on the coating layers resulting in a slight interlacing of the crystals of the active material, and also in the elimination of part of the liquid from the coating, which passes onto the rolls 10, then on the wiping rolls 11, and finally runs on the drainer 18. However, the step of compression and wiping at this point may be omitted.

Next, the band passes into a dryer where the remaining liquid is evaporated. The said dryer can be heated by any appropriate heating means, such as electrical resistance, steam coils, etc. However, the preferred heating process consists in using infra-red radiations such as produced, for instance, by infra-red lamps 13. By means of infra-red heating, the effect of the drying is more homogeneous for it is carried on inside the mass of the active material itself, and cracks upon the coatings may consequently be avoided. In order to avoid oxidation, which could arise during the drying operation, it is advisable to maintain an atmosphere of inert or reducing gas within the dryer 13. For this purpose the dryer is supplied with any suitable gas, such as hydrogen, carbonic gas, nitrogen, cracked ammonia gas etc., which may be introduced through the pipe 14. The excess of the gas escapes from the openings provided in the walls of the dryer for the inlet and outlet of the band.

The band leaves the dryer in a dry condition. It then passes between two rolls 15, adjustably spaced, which compress very strongly the coatings of active material. A compression of at least one ton per square centimetre is necessary. Owing to this strong compression, a fine interlacing of crystals or particles of active material is produced. The interlacing, of course, also occurs between the particles of active material which are located in the holes of the carrying band. Numerous links or connections, therefore, are established between both layers of active material covering both faces of the carrying band. It results that the layers of active material are strongly held to the carrying band and exhibit a good cohesion as well.

The band so prepared is wound up around the driven roll 16 which, by turning, unwinds the band from roll 5 and draws it through the device which has just been described. Rolls 10 are preferably also driven, and their motion is synchronized with the movement of the band.

While the above description discloses a preferred embodiment of the electrode manufacture, it will be understood that other devices may be used. One of them consists in providing the container 6 with one or more stirring propellers which hold the active material in suspension in the liquid medium and project it upon both faces of the band. In this case, the product required for making the suspension viscous, is used in smaller amount, and the suspension itself contains less active material for a given quantity of liquid. However, the results, although superior to those heretofore known, are not as good and not as uniform as by the above-described method.

In order to increase further the adherence and cohesion of the active material coatings on the band, a sintering operation may be added to the manufacturing process. For this purpose, the band passes through a sintering furnace provided wiht a reducing or neutral atmosphere following its passage through rolls 15 (the said furnace is not shown in the diagram of Fig. 2). The furnace is preferably heated to a temperature equal to about the three-quarters of the melting point temperature (expressed in ° C.) of the active material. It is advisable, previously to coat the perforated band with a thin electrolytical layer of the same metal which is to be used as the active material. These electrolytical layers are strongly adherent to the faces of the band and the sintering operation results in welding them together with the active material further to be coated on both faces of the band. However, the sintering operation is not absolutely necessary and is no essential part of the process.

The result of the above-described process is a band of carrier metal with coatings of active material. It is next cut into the desired shapes, which may be as shown in Fig. 3, or any other required shape, by apparatus known in the art. Where the perforations have been arranged as above described, the cutting will preferably be along the imperforated portions 3 of Fig. 1. It is, of course, also possible, and in many cases preferable, to cut the finished band into plates without first winding it on roll 16. In that case, a pair of pinch rolls may be used to draw or propel the strip. In the non-perforated part of zone 2, the head of the plate shown at 17, in drawing 3, is cut up according to need. When electrodes of very large dimensions are wanted, such for instance, as those used in winding assemblies, the zone 1 may be supplied with several terminal lugs.

It is not essential to prevent the formation of an active material coating on the zone 1, as by removing the coating from this zone while passing through slot 9. In that case, it is sufficient to mash the active material by a very strong compression, and to fashion out of it the head of the plate and the lug.

Reference is herewith made to my co-pending applications Serial Nos. 415,748 and 415,749, both filed March 12, 1954, and containing disclosures of related and different inventions.

The assembly of the plates prepared as has been described in primary or secondary batteries, does not differ from the usual industrial processes.

It is obvious that variations may be made in the method of procedure which has been described without departing from the spirit of the invention.

What is claimed is:

1. A method of producing plates for galvanic cells comprising maintaining an aqueous suspension consisting of pulverulent particles of an active material, water and a viscosity increasing agent dissolved in the water, said particles being metallic crystals selected from the group consisting of cadmium, zinc and silver and being characterized by interlacing properties, continuously passing a perforated band through the said suspension without agitation thereby coating both sides of said band and filling the perforations therein with suspended active material, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least one ton per square centimeter without application of heat is applied to the dry coatings effecting interlacing of the said particles, and cutting the band into plates.

2. A method of producing plates for galvanic cells comprising maintaining an aqueous suspension consisting of pulverulent particles of an active material, water and a viscosity increasing agent dissolved in the water, said particles being metallic crystals selected from the group consisting of cadmium, zinc and silver and being characterized by interlacing properties, continuously passing a perforated band of a metal selected from the group consisting of nickel, copper, and iron through the said suspension without agitation and thereby coating both sides of said band and filling the perforations therein with suspended active material, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least one ton per square centimeter without application of heat is applied to the dry coatings effecting interlacing of the said particles, and cutting the band into plates.

3. A method of producing plates for galvanic cells comprising maintaining an aqueous suspension consisting of pulverulent particles of an active material, water and a viscosity increasing agent dissolved in the water, said particles being metallic crystals selected from the group consisting of cadmium, zinc and silver and being characterized by interlacing properties, continuously passing a perforated band of a metal selected from the group consisting of copper and iron through a nickel-plating bath and plating both surfaces of said band with a layer of nickel between about 1 and about 5 microns thick, continuously passing the plated band through the said suspension without substantial agitation and thereby coating both sides of said band and filling the perforations therein with suspended active material, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least one ton per square centimeter without application of heat is applied to the dry coatings effecting interlacing of the said particles, and cutting the band into plates.

4. A method of producing plates for galvanic cells comprising maintaining an aqueous suspension consisting of pulverulent particles of an active material, water and a viscosity increasing agent dissolved in the water, said particles being metallic crystals selected from the group consisting of cadmium, zinc and silver and being characerized by interlacing properties, continuously passing a band of metal screen having a mesh from about 2 to about 5 millimetres in diameter through the said suspension without substantial agitation thereby coating both sides of said band and filling the perforations therein with suspended active material, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least one ton per square centimeter without application of heat is applied to the dry coatings effecting interlacing of the said particles, and cutting the band into plates.

5. A method of producing plates for galvanic cells comprising perforating a metallic band having a thickness ranging from about 0.05 to about 0.15 millimetre, the perforations having a diameter ranging from about 1 to about 3 millimetres in diameter, arranging said perforations so that their area is at least 30% of the total area of the band and in such configuration that upon the perforated band being cut into plates each plate will have imperforated edge portions and a uniformly perforated central portion, maintaining an aqueous suspension consisting of pulverulent particles of an active material, water and a viscosity increasing agent dissolved in the water, said particles being metallic crystals selected from the group consisting of cadmium, zinc and silver and being characterized by interlacing properties, continuously passing the perforated band through the said suspension without substantial agitation thereby coating both sides of said band and filling the perforations therein with suspended active material, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least one ton per square centimeter without application of heat is applied to the dry coatings effecting interlacing of the said particles, and cutting the band into plates.

6. A method according to claim 1 in which the active material is cadmium in the form of microcrystals.

7. A method according to claim 1 in which the active material is a mixture of cadmium in the form of microcrystals selected from said group with another metal selected from the group consisting of iron and nickel, the said mixture being obtained by electrolysis using a high current density on the cathode of a solution which contains cadmium salts and salts of the said other metal, the ratio of the said other metal in the mixture amounting up to 30% of the total weight of the active material.

8. A method according to claim 1 in which the active material is zinc.

9. A method according to claim 1 in which the active material is zinc in the form of fine acicular particles obtained by blowing a strong air jet upon a liquid zinc trickle.

10. A method according to claim 1 in which the active material is zinc in the form of arborescent microcrystals resulting from electrolysis of a solution of a zinc salt using a high current density on the cathode.

11. A method according to claim 1 in which the suspension contains as the viscosity increasing agent dissolved in the water less than 10 percent by weight of at least one of the organic products selected from the group consisting of alginates, gelatins, starch and cellulose derivatives.

12. A method according to claim 1 in which the suspension contains dissolved therein as the viscosity increasing agent between about 1 and about 5% of the sodium salt of carboxymethylcellulose.

13. A method according to claim 1 in which the suspension contains one to three parts by weight of active material per part of solution.

14. A method according to claim 1 in which the drying chamber is heated by infra-red radiations.

15. A method according to claim 1 in which the coated band is protected by a non-oxidizing atmosphere while passing through the drying chamber.

16. A plate for a galvanic cell prepared in accord with the method of claim 1.

References Cited in the file of this patent

UNITED STATES PATENTS

| | | |
|---|---|---|
| 1,235,805 | Jennings | Aug. 7, 1917 |
| 1,857,987 | Twiss et al. | May 10, 1932 |
| 2,075,492 | Zimmerman | Mar. 30, 1937 |
| 2,213,128 | Langguth | Aug. 27, 1940 |
| 2,503,970 | Rupp | Apr. 11, 1950 |
| 2,526,731 | Coburn | Oct. 24, 1950 |
| 2,639,240 | Ehle | May 19, 1953 |
| 2,677,006 | Ameln | Apr. 27, 1954 |
| 2,681,375 | Vogt | June 15, 1954 |

FOREIGN PATENTS

| | | |
|---|---|---|
| 34,501 | Sweden | Mar. 20, 1911 |

OTHER REFERENCES

"Electrical World," September 14, 1946, Battery Plates Dried with Infrared Lamps, by E. Jirk and A. McIlwraith.

Industrial and Engineering Chemistry, pages 943–947, volume 37, No. 10.